United States Patent [11] 3,619,579

| [72] | Inventor | Earl Stuart Perkins |
| | | Oak Brook, Ill. |
| [21] | Appl. No. | 871,819 |
| [22] | Filed | Oct. 28, 1969 |
| [45] | Patented | Nov. 9, 1971 |
| [73] | Assignee | Butler National Corporation |
| | | Oak Brook, Ill. |

[54] TIME OF ARRIVAL AND GROUND SPEED COMPUTER
9 Claims, 4 Drawing Figs.

[52] U.S. Cl. ..................................... 235/150.2,
 235/184, 343/9
[51] Int. Cl. ..................................... G06g 7/78,
 G01s 9/44
[50] Field of Search ........................................... 235/150.2,
 151.3, 151.32, 184, 193; 35/10.2; 343/5, 8, 9

[56] References Cited
UNITED STATES PATENTS
2,533,256 12/1950 Wilkie .......................... 235/151.32 X
3,270,341 8/1966 Sirons ........................... 343/9
3,398,267 8/1968 Hattendorf ..................... 235/184 X
3,406,280 10/1968 Vago ............................ 343/9

Primary Examiner—Malcolm A. Morrison
Assistant Examiner—Jerry Smith
Attorney—Hill, Sherman, Meroni, Gross and Simpson ABSTRACT: A computer for indicating ground speed and which receives input from distance measuring equipment and a clock and has an output which indicates if an indicated ground speed is high or low so that ground speed indicator may be adjusted to a correct value. A modification allows the estimated time of arrival to be indicated and a further modification includes a servo motor which is driven by any unbalance signals to indicate the correct ground speed.

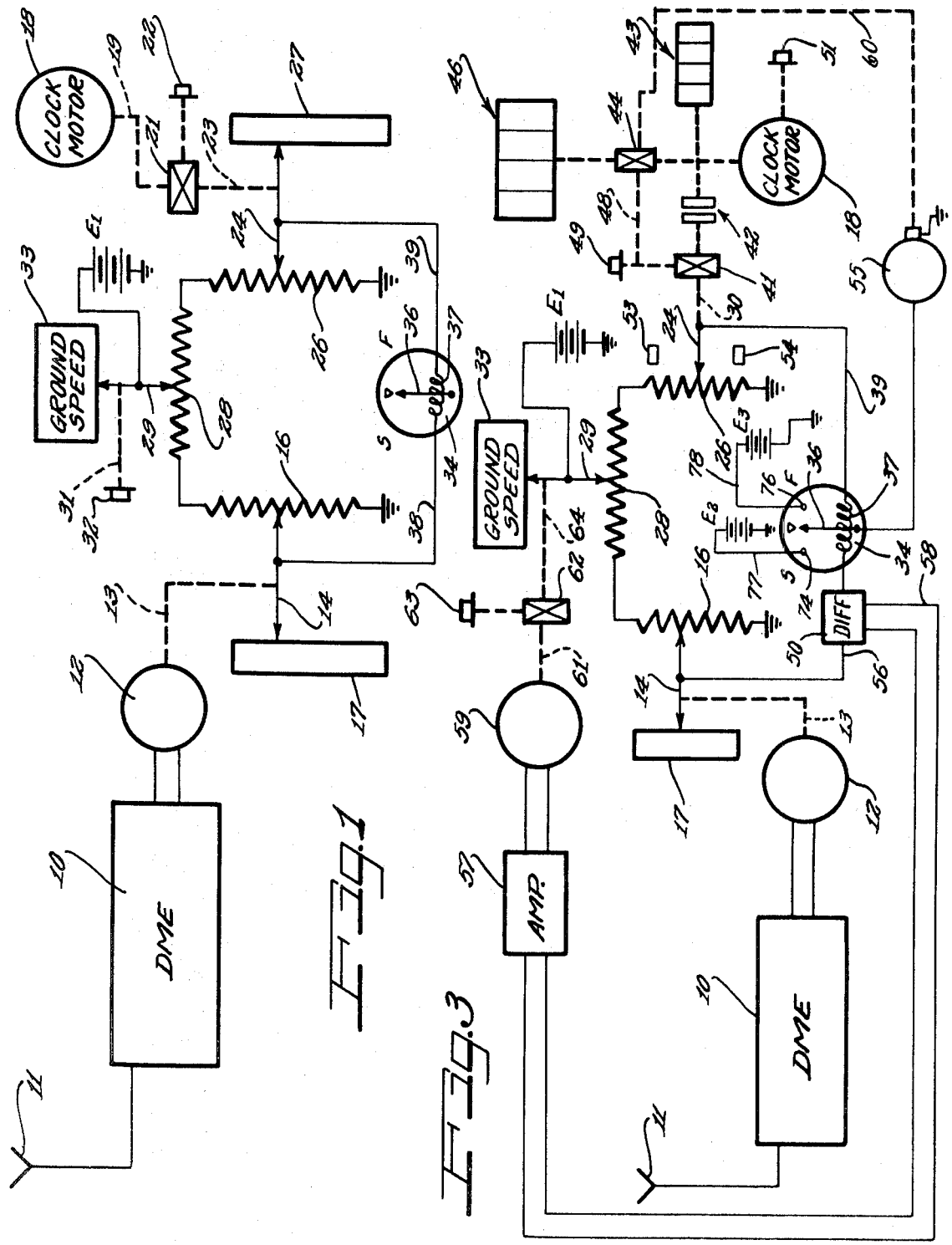

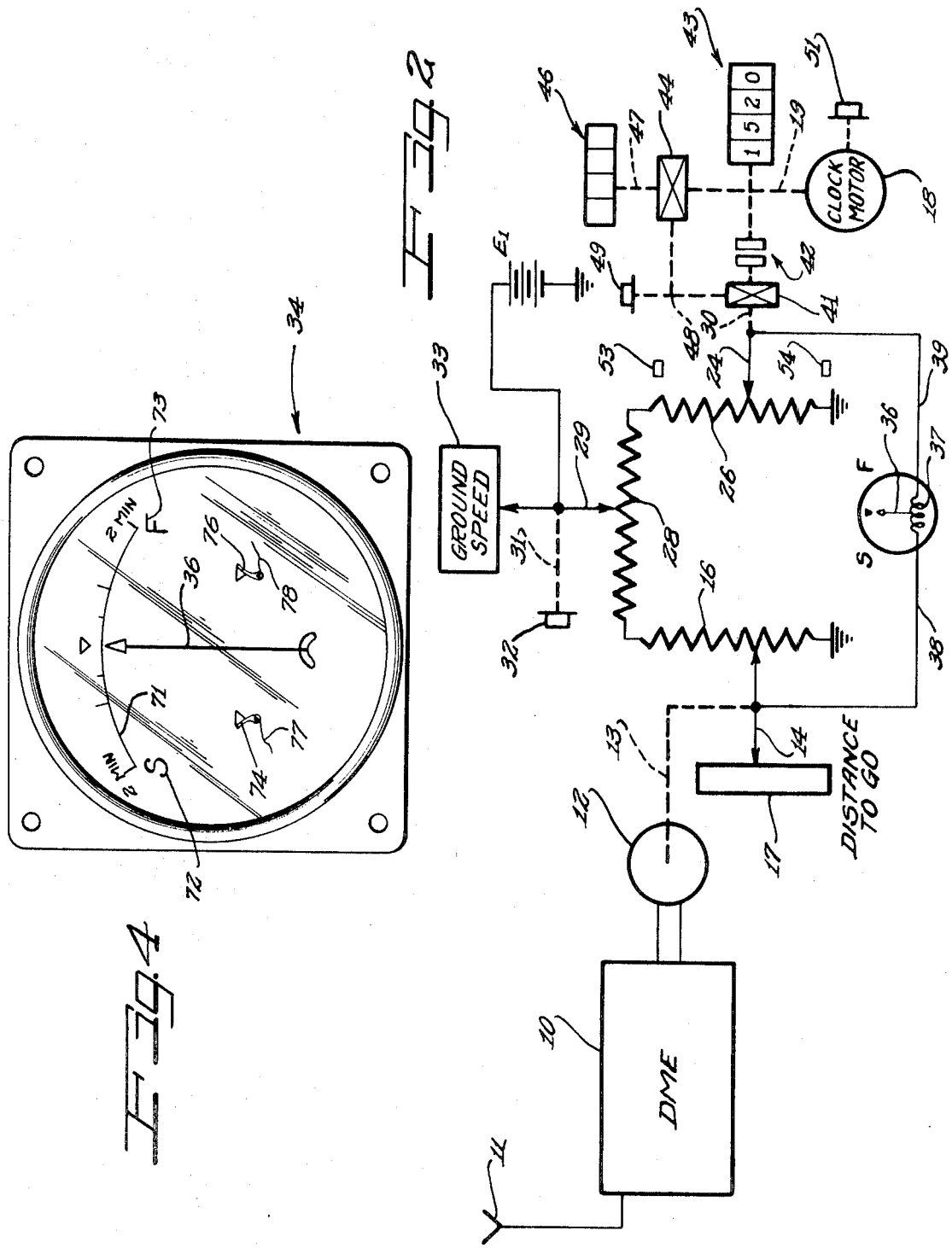

р,619,579

TIME OF ARRIVAL AND GROUND SPEED COMPUTER

BACKGROUND OF THE INVENTION

1. Field of the Invention

This invention relates, in general to aircraft navigation equipment and in particular to apparatus for automatically indicating the ground speed, estimated time of arrival or other navigation information to a pilot of an aircraft.

2. Description of the Prior Art

Pilots and navigators for aircraft have previously calculated their ground speed by measuring the time between two fixed points and by dividing the distance between these points by the elapsed time. This has required taking of fixes and dividing the distance between the fixes by the elapsed time which requires time and effort by the pilot of navigator of an aircraft.

SUMMARY OF THE INVENTION

The present invention comprises a time of arrival computer and ground speed indicator which receives inputs from a distance measuring equipment and from a clock motor and includes a ratio potentiometer which is calibrated in ground speed so that if an output meter reads zero the ground speed made good is indicated. If the meter reads fast or slow the ratio pot may be centered to indicate the correct ground speed when the meter is centered. The system also allows the estimated time of arrival to be indicated by adding differentially the minutes to go to the present time to obtain the estimated time of arrival.

The minutes to go output may be converted to an estimated time of arrival by coupling differentially to the clock the minutes to go. In one embodiment, an automatic followup system detects the current to the fast-slow meter and controls a followup motor to reduce the current to the followup motor to zero.

Other objects, features and advantages of the invention will be readily apparent from the following description of certain preferred embodiments thereof, taken in conjunction with the accompanying sheets of drawings, although variations and modifications may be effected without departing from the spirit and scope of the novel concepts of the disclosure, and in which:

FIG. 1 is a schematic view of the time of arrival computer of this invention;

FIG. 2 is a schematic view of a modification of the invention;

FIG. 3 is a schematic view of a further modification; and

FIG. 4 is an enlarged plan view of the fast-slow meter of the invention. Detailed Description of the Preferred Embodiments FIG. 1 illustrate s the computer of this invention and comprises a distance measuring equipment 10 which has an antenna system 11 and which has an output distance motor 12 with an output shaft 13 that drives a wiper 14 which slidably engages a resistor 16. The wiper 14 also has an indicator at one end thereof which may be read against a distance to go scale 17. A clock motor 18 has an output shaft 19 which supplies an input to a differential 21 that also receives an input from a knob 22 and has an output shaft 23 for positioning a wiper contact 24 which engages a resistor 26. One end of the wiper 24 may be read against a time to go scale 27. First ends of the resistors 16 and 26 are connected to ground and the resistor 28 is connected between their other ends. A wiper contact 29 engages the resistor 28 and may be positioned by shaft 31 that has a knob 32. A battery $E_1$ is connected to the wiper contact 29 and has its other terminal connected to ground. One end of the wiper contact 29 may be read against a ground speed scale 33. A meter 34 has an energizing winding 37 which has one end connected by lead 38 to wiper 14 and the other end connected by lead 39 to wiper 24. The meter 34 has a zero counter needle 36 which is centered when there is no current passing through the coil 37.

In operation, the DME system 10 may be tuned to a particular ground station and the motor 12 will position the wiper 14 so that the wiper 14 indicates the distance to go to the station.

Although the distance to go to the station is assumed in this example, it is to be realized, of course, that the wiper 14 may also be energized by an area navigation system so that the distance to any arbitrary way point may also be indicated.

If it be assumed, for example, that a full scale of the distance to go indicator 17 and the resistor 16 is 100 miles and the distance to station is 75 miles, the wiper 14 would be initially positioned to a point on the resistor 16 one-fourth of the way down relative to FIG. 1. The wiper contact 24 is set to a position with knob 22 in accordance with the craft's air speed and in a particular example if the aircraft moves at 180 miles per hour or 3 miles a minute, the wiper 24 would be set to a position on the resistor 26 corresponding to twenty-five minutes corresponding to the 75 mile distance set on the resistance 16. The indicator 33 is calibrated so that the wiper 29 may be positioned relative to the resistor 28 to 180 miles per hour.

If the actual ground speed being made good differs from 180 miles per hour due to cross-wind or indicated air speed errors current will pass through the leads 38, the winding 37 and lead 39, thus causing the needle 36 to deflect to the left or right depending upon the polarity of the signal. In this event, the pilot may adjust wiper contact 29 with knob 31 to a ground speed so that the needle 36 will center. If the new indicated ground speed differs substantially from the initial assumed ground speed, the time to go wiper 24 may be adjusted with knob 22.

As the aircraft approaches the station, the wiper 14 will gradually be driven toward the grounded end of the resistor 16 and the distance to go will be continually indicated on the indicator 17. Simultaneously, the time to go will be indicated on the indicator 27 as the wiper 24 is gradually driven toward the grounded end of resistor 26 by the clock motor 18. The pilot may continuously monitor ground speed on the indicator 33.

If it should be assumed that the two wiper contacts 14 and 24 are set at the maximum position at the start and if the rate at which the DME voltage approaches zero equals the rate at which the clock voltage approaches zero, the current through the zero centermeter 34 will be zero if wiper 29 is at the midpoint of resistor 28. Considering that the distance potentiometer 14 relative to the resistor 16 has a constant rate (variable only with aircraft motion), the time to go setting on the clock scale will change with the ratio of the ground speed setting corresponding to the position of the wiper 29 relative to the resistor 28 and vice versa but only one setting of each will be proper for maintaining zero current through the meter 34 and these settings will correspond to the time/distance ratio made good. Thus, if the ground speed is set too low or the time to go set too high, the pointer 36 will move toward slow and the wipers 29 and 24 may be adjusted to obtain the correct ground speed and time to go.

Thus, the computer of FIG. 1 allows the pilot to constantly monitor his ground speed and to know the time to go before arriving at the reference geographic position.

FIG. 2 illustrates a modification of the system of FIG. 1 wherein the estimated time of arrival is indicated rather than the time or minutes to go as in FIG. 1. In FIG. 2, for example, stops 53 and 54 are placed at opposite ends of the resistor 26 to limit the motion of wiper contact 24 and the wiper contact 24 is controlled by the output shaft 30 of a differential 41 which receives an input from shaft 48 which has a knob 49 The shaft 48 is also connected to a differential 44 which has an output shaft 47 that connects to an estimated time of arrival indicator 46. The clock motor 18 has its output shaft 19 connected to the differential 44 and to the present time indicator 43. The clock motor 18 has a knob 51 for adjusting the present time indicator 43 to the the proper time. A slip clutch 42 is connected between the shaft 19 of the clock motor and the input shaft of the differential 41.

In operation, the DME 10 sets wiper contact 14 relative to resistor 16 to indicate the distance to the station on indicator 17. The wiper 29 is set by knob 32 to the estimated ground speed and the time to go wiper 24 is adjusted by knob 49 relative to the resistor 26. If it is to be assumed that the timing resistor 26 corresponds to 99 minutes upon setting the clock to the correct time, the estimated time of arrival will read 99 minutes later if the wiper 24 is at the top relative to FIG. 2. By reducing the position of wiper contact 24 by knob 49 corresponding to the estimated ground speed until the meter 34 is centered will result in the estimated time of arrival being indicated on indicator 46.

If the assumed ground speed is correct, the wiper 14 of the DME pot 16 will arrive at zero simultaneously with the wiper contact 24 which is driven by the timer motor 18 is the ground speed is maintained at the setting of the ratio pot. If the meter 34 indicates unbalanced condition, the assumed ground speed may be changed by moving the wiper contact 29 with the knob 32 to obtain a more accurate ground speed.

FIG. 3 illustrates a modification of the invention wherein the proper setting of the ground speed indicator is accomplished with a servo system. The current change between wipers 14 and 24 is detected with a differentiator 50 and passed through an amplifier 57 which supplies an output to a ground speed motor 59 that has an output shaft 61 which is connected to a differential 62 and also receives an input from a knob 63. Differential 62 has an output shaft 64 which positions wiper contact 29 to the correct ground speed which is indicated on indicator 33.

If the desired ground speed varies with the estimated time of arrival, either or both may be optimized. In operation, the wiper 24 is set by knob 49 to a time to go position corresponding to the estimated ground speed. The knob 63 is used to set the estimated ground speed by moving the wiper 29 relative to the ground speed indicator 33 until the estimated ground speed is indicated. If the estimated ground speed is too high or too low, current will pass between wipers 14 and 24 which is detected by the amplifier 57 and will cause motor 59 to drive the wiper 29 through differential 62 to position it to reduce the current between wipers 14 and 24 to zero.

The voltage across the meter 34 may also be used to cause a motor 55 to adjust the estimated time of arrival indicator 46.

Electricals stops 74 and 76 are mounted on meter 34 as shown in FIGS. 3 and 4. Lead 77 is connected to stop 74 and to a positive voltage source $E_2$. Lead 78 is connected to stop 76 and to negative voltage course $E_3$. The needle 36 is connected to a motor 55 which has its other terminal grounded. The other sides of sources $E_2$ and $E_3$ are grounded.

The output shaft 60 of motor 55 is connected to differential 44 to drive the indicator 46 when the needle 36 engages one of the stops 74 or 76.

An alternate system would utilize the detected current between wipers 14 and 24 to operate a throttle control to increase the ground speed or decrease it to reduce the current between wipers 14 and 24 to zero.

A cruise control in which an optimum speed fuel ratio is maintained could also be utilized with the present invention.

As seen, this invention provides a navigation systems computers which indicated to a pilot his correct ground speed and also his estimated time of arrival.

FIG. 4 is a detailed view of the meter 34. An arcuate indicia 71 has an S,72 for slow and an F,73 for fast against which the needle 36 may be read.

Electrical stop contacts 74 and 76 have leads 77 and 78 for indicating when the needle hits the stops 74 or 76.

Although minor modifications might be suggested by those versed in the art, it should be understood that I wish to embody within the scope of the patent warranted hereon all such modifications as reasonably and properly come within the scope of my contribution to the art.

I claim as my invention:

1. A navigation computer comprising:
   means for generating a signal indicative of distance of a craft from a reference position,
   said means for generating a distance signal comprises a distance measuring equipment and a distance measuring potentiometer with a wiper contact drive by said distance measuring equipment;
   means for generating a signal indicative of time of arrival at said reference position,
   wherein said means for generating said time signal comprises
   a clock and a time measuring potentiometer with a wiper contact
   driven by said clock;
   means for generating a signal indicative of ground speed connected to said means for generating said distance and time signals,
   wherein said means for generating said ground speed signal
   comprises a potentiometer with a wiper contact connected
   between said first ends of said distance measuring and said time
   measuring potentiometers;
   a detector connected to said means for generating said distance and said time signals;
   a voltage source connected between the wiper contact of said ground speed potentiometer and the second ends of said distance measuring and time measuring potentiometers; and
   means for moving the wiper contact of said ground speed potentiometer, and a ground speed indicator driven by said means for moving the wiper contact of said ground speed potentiometer.

2. A navigation computer according to claim 1 comprising a distance to go indicator associated with the wiper contact of said distance measuring potentiometer.

3. A navigation computer according to claim 2 comprising a time to go indicator associated with the wiper contact of said time measuring potentiometer.

4. A navigation computer according to claim 1 wherein said detector is connected between the wiper contacts of said distance measuring and said time measuring potentiometers.

5. A navigation computer according to claim 4 wherein said detector comprises a current sensing means.

6. A navigation computer according to claim 5 comprising a driving means connected to the wiper contact of said ground speed potentiometer and receiving an output from said current sensing means.

7. A navigation computer according to claim 6 wherein said driving means comprises a servo motor.

8. A navigation computer according to claim 1 comprising means for adjusting the position of the wiper contact of said time measuring potentiometer independently of said clock.

9. A navigation computer according to claim 8 comprising an estimated time of arrival indicator which receives inputs from said clock and said time measuring potentiometer.

* * * * *